United States Patent [19]
Biondo

[11] Patent Number: 5,809,343
[45] Date of Patent: Sep. 15, 1998

[54] PHOTOGRAPHIC FILM CONTAINER LOADING APPARATUS

[76] Inventor: John Biondo, 7132 Johnson Dr., Suite B, Pleasanton, Calif. 94588

[21] Appl. No.: 813,113

[22] Filed: Mar. 7, 1997

[51] Int. Cl.$^6$ .............................. G03B 15/00; G03B 17/50
[52] U.S. Cl. .................................. 396/2; 396/30; 396/360
[58] Field of Search .................. 396/1, 2, 6, 30, 396/36, 360, 429, 511, 535

[56] References Cited

U.S. PATENT DOCUMENTS

| | | | |
|---|---|---|---|
| 3,744,389 | 7/1973 | Clark | 396/2 |
| 3,744,390 | 7/1973 | Clark | 396/2 |
| 3,747,493 | 7/1973 | Glidden et al. | 396/30 |
| 3,797,932 | 3/1974 | Endter et al. | 396/30 |
| 3,820,136 | 6/1974 | Kennedy | 396/2 |
| 4,089,017 | 5/1978 | Buldini | 396/2 |
| 4,091,397 | 5/1978 | Gulbrandsen | 396/2 |
| 4,647,168 | 3/1987 | Takahashi et al. | 396/2 |
| 5,017,953 | 5/1991 | Biondo, Jr. | 396/2 |
| 5,109,242 | 4/1992 | Massarsky | 396/1 |

*Primary Examiner*—Eddie C. Lee
*Attorney, Agent, or Firm*—Bielen, Peterson & Lampe

[57] ABSTRACT

A loading apparatus for photographic film which is used in conjunction with a camera that may be booth mounted. The apparatus includes a platform which is rotatably linked to a base, such as the booth structure or the floor of the booth. The platform includes a surface and a multiplicity of holders for film containers or cartridges which are located in side-by-side configuration. The platform is turned or rotated relative to the base member and is used in conjunction with an elevator mechanism for removing the film containers from the surface of the platform, to the vicinity of a portion of the camera for exposure, and back to the platform when the film has been exposed.

12 Claims, 6 Drawing Sheets

PHOTOGRAPHIC FILM CONTAINER LOADING APPARATUS

BACKGROUND OF THE INVENTION

The present invention relates to a novel and useful photographic film container loading apparatus.

Automatic photographic systems are commonplace in public malls, amusement parks, stores and other places. Many photographic systems take the form of booths which generate photographic images, usually on a coin operated basis. Many photographic methods are employed to produce a photographic image such as direct positive silver halide photography, dye sublimation printing, laser printing, ink jet printing, and instant self-developing film.

Automatic coin operated photographic booths utilizing self-developing film cassettes or units have proved to be a convenient way to accomplish unattended booth photography. Prior self-developing film units have been faced with the problem of automatically inserting an unexposed film cassette into a self-developing film camera, removing the exposed film cassette from the camera, and inserting a fresh unexposed film cassette thereafter.

Prior art devices such as those shown in U.S. Pat. Nos. 3,744,389, 3,744,390, 3,820,136, 4,647,168, and 5,017,953, employ stacking arrangements in which self-developing film cassettes are piled one atop another and removed one at a time from the stack for insertion into the camera. In many cases, such stacking arrangement of film cartridges results in the jamming of the film cartridges, since the lowest cartridge in a stack, is always under the influence of the weight of the remaining cartridges in that stack. In addition, removing a cartridge from the bottom of the stack may cause injury to the film cartridge in many cases. Further, the mechanism operating the removal of film cartridges from a stack, as well as a technician reloading or maintaining the stacking equipment, are subject to traumatic forces. The latter may result in injury to the technician. The jamming of cartridges in a photo booth using self-developing film through a stacking arrangement requires intensive labor to unjam the same.

U.S. Pat. No. 5,109,242 describes a rotatable film magazine in the form of a drum with partitions for each pack. However, a bifurcated dispensing path and a camera back opener are required in such system, i.e., a complex operation. In addition, it has been found that it is difficult to maintain the balance of the drum when cartridges have been partially removed therefrom.

A film container loading apparatus having great reliability and requiring a low servicing obligation would be a notable advance in the photographic industry.

SUMMARY OF THE INVENTION

In accordance with the present invention a novel and useful photographic film container loading apparatus is herein provided.

The apparatus of the present invention includes a round platform having a base portion and a turntable which is rotatable about an axis. The platform is linked to a base surface such as a floor, a photographic booth and the like.

Holding means is found in the platform upper surface for mounting a plurality of film containers or cartridges in side-by-side configuration. Such holding means may take the form of a plurality of openings or recesses in the turntable of the platform. A separate opening may be formed in the base portion of the platform, and include a shoulder to hold the cartridges in place. Such base portion opening would lie adjacent the camera.

Rotation means is also found in the present invention for turning the turntable of the platform relative to the base member. Such rotation means may take the form of a gear or chain driven mechanism. In addition, the rotation means may be defined as a frictional wheel or capstan which contacts the outer periphery of the platform turntable. Rotation would take place according to control signals fed to a motor connected to the capstan.

Motivating means is also found in the present invention for removing film containers from the holding means at the surface of the platform. The film containers or cartridges are then placed in the vicinity of the camera for the purpose of exposure of the film. After exposure, the film cartridges are replaced in the platform holding means. The platform is then rotated, and the next cartridge in line is fed to the camera in a similar manner. Such motive means may take the form of an elevator which includes an element such as a plate for contacting the film cartridge. The elevator element also urges the film cartridge outwardly from the platform surface, through a particular opening in the platform, and into the vicinity of the camera to expose the film. The elevator may include a spring biased arm and a cam mechanism which is operable by a motor. Thus, the elevator would move in a particular cycle and at a particular rate according to electrical signal.

In addition, cushioning means may be found in the present invention for absorbing the pressure exerted on the elevator element when it is carrying a film cartridge. Such cushioning means may take the form of a plurality of springs between a pair of plates. The plates may also include guides to control the movement of the springs during the flexing of the springs.

It may be apparent that a novel and useful apparatus for loading photographic film containers into a camera has been heretofore described.

It is therefore an object of the present invention to provide a photographic film cartridge loading apparatus which includes minimal mechanical and electrical components for the sake of reliability.

Another object of the present invention is to provide a photographic film cartridge loading apparatus which is able to move a film cartridge into the vicinity of or into contact with a camera without damaging the cartridge.

Yet another object of the present invention is to provide a photographic film cartridge loading apparatus which does not suffer from the disadvantages found in a loading device which stacks film cartridges.

A further object of the present invention is to provide a photographic film loading apparatus which requires relatively low energy for its operation.

Another object of the present invention is to provide a photographic film container loading apparatus which is particularly applicable to unattended photographic booths for a relatively long period of time.

The invention possesses other objects and advantages especially as concerns particular characteristics and features thereof which will become apparent as the specification continues.

BRIEF DESCRIPTION OF THE DRAWINGS

FIG. 1-A is a partial top right perspective view depicting the elevator mechanism of the present invention.

Figure 1:
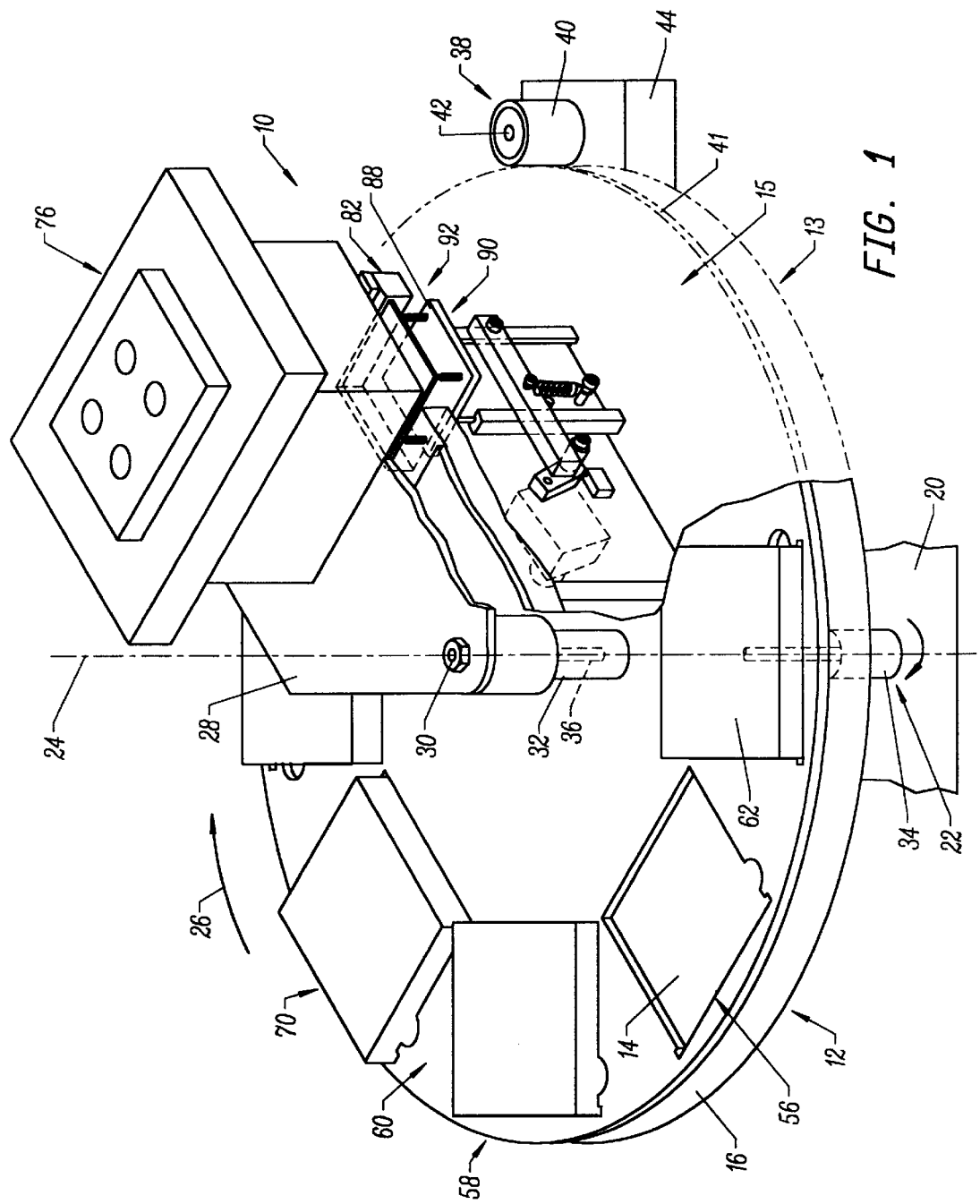
FIG. 1 is a top right isometric view of a portion of the invention showing the rotation and motive means in particular.

For a better understanding of the invention references made to the following detailed description of the preferred embodiments which should be taken in conjunction with the prior described drawings.

DETAILED DESCRIPTION OF THE PREFERRED EMBODIMENTS

Various aspects of the present invention will evolve from the following detailed description of the preferred embodiments thereof which should be referenced to the prior described drawings.

The invention as a whole is depicted in the drawings by reference character 10. Apparatus 10 includes as one of its elements a platform 12 which is disc-shaped. Platform 12 possesses a base portion 13 having an upper surface 14, a rounded edge portion 16 and a lower surface 18, best shown in FIGS. 1–4. Platform 12 also includes a turntable 15 which rotates relative to base member 13. Platform 12 is supported or linked to base member 20 which may be a floor, table, pedestal, and the like. In certain cases, base member may take the form of a photographic booth structure, although the present invention is not deemed to be limited to that application. Turntable 15 rotates about axis 24 according to directional arrow 26. In this regard, central shaft element 22 is held to plate 28 by a fastener 30. Bushings 32 and 34 serve as spacers and permit the rotation of turntable 15 around a central elongated member 36, which may be a threaded member to accommodate fastener 30.

Rotation means 38 is also found in the present invention for turning platform 12 relative to base member 20. Rotation means, depicted in FIGS. 1 and 2, includes a friction wheel or capstan 40 which is connected to output shaft 42 of a conventional gear mechanism 44. Motor 46 obtains power from a conventional source to turn output shaft 42 through gear mechanism 46. Thus, the engagement of friction wheel 40 on edge portion 41 of turntable 15 rotates turntable 15 accordingly. Bracket 48 serves as a mount for rotation means 38 for turntable 15. Pin 50 serves as a pivot for bracket 48 and permits rotation means 38 to be pushed aside such that friction wheel or capstan 40 is no longer in engagement with edge portion 41 of turntable 15 in order to release turntable 15 for the sake of maintenance, repair, and the like. Spring 52 urges engagement of friction wheel 40 with edge portion 41 of turntable 15 when rotation means 38 is being used. Spring 52 connects to bracket 48 and a structural member 54, which is itself connected to base portion 13 in this regard.

Figure 1A:
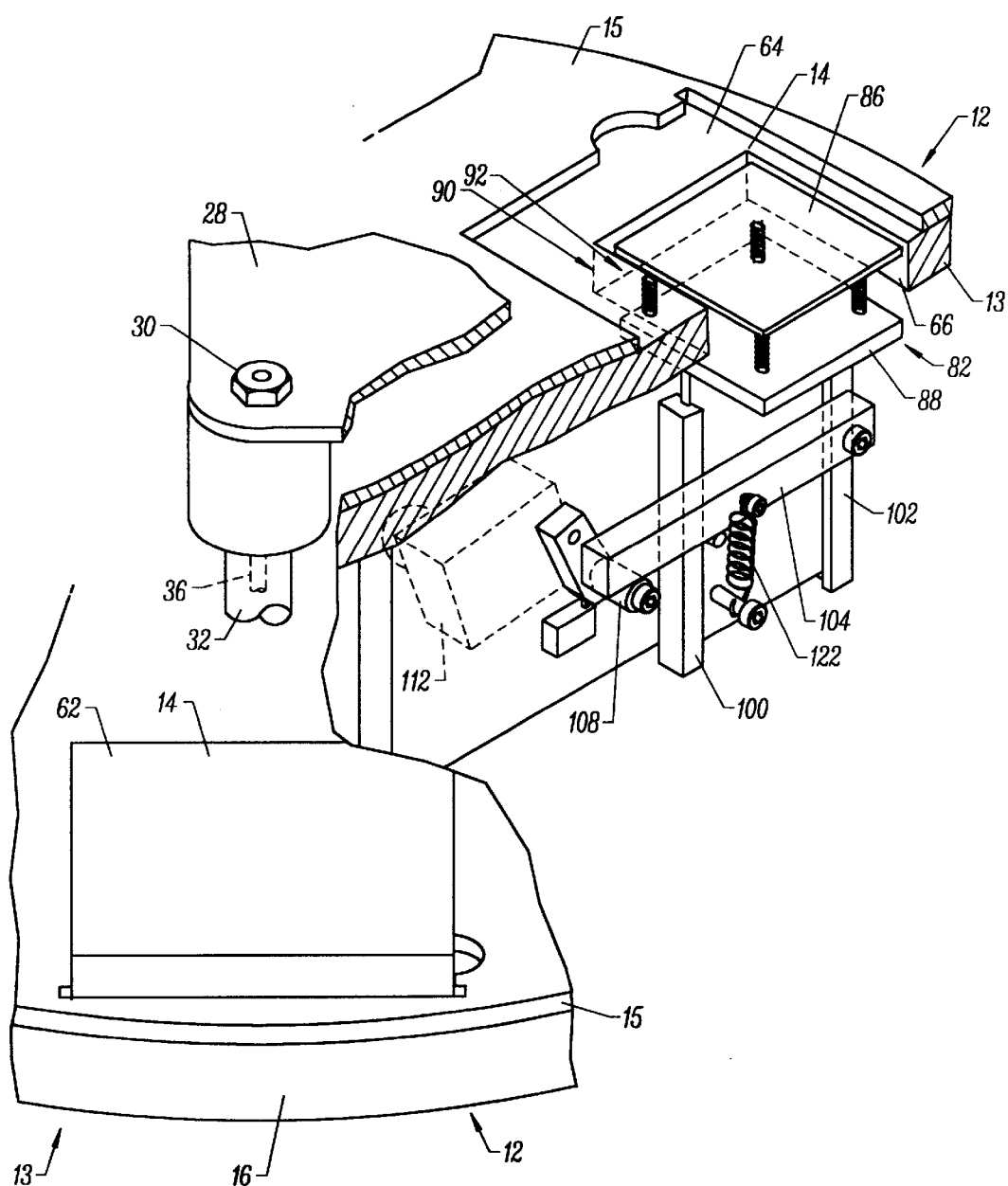
Figure 2:
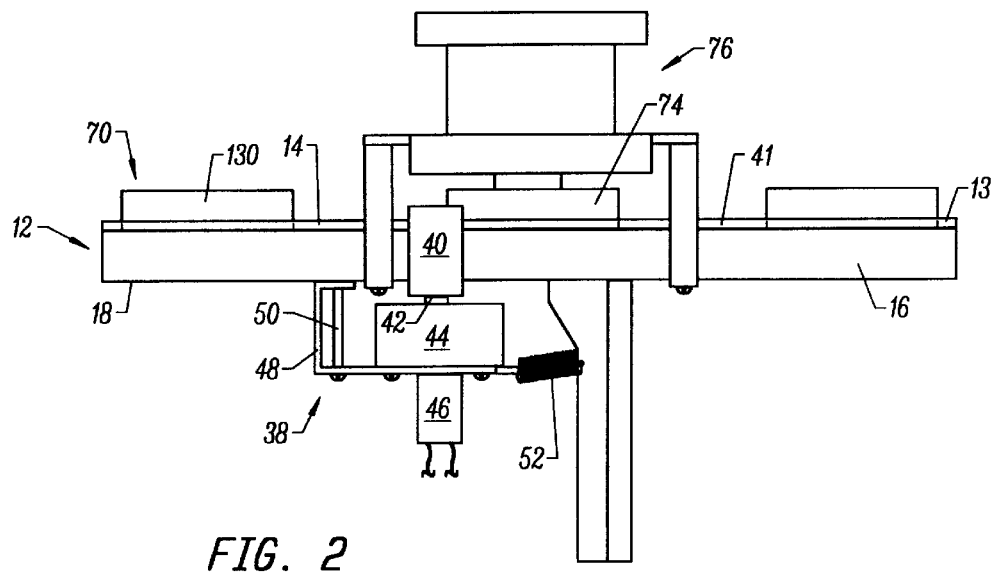
FIG. 2 is a partial side elevational view of the present invention depicting the rotation means for turning the cartridge holding platform.

The apparatus of the present invention also includes holding means 56 for mounting a plurality of film cartridges or containers 70 in side-by-side configuration at surface 14 of platform 12 within turntable 15. Holding means 56 may take the form of a multiplicity of successive recesses 60 which comprise openings through turntable 15. Exemplary recesses 62 and 64 are best shown in FIG. 1A. It should also be noted that an opening 66 is found through base 13 of platform 12, the importance of which will be discussed hereinafter. Thus, in FIG. 1A it may be observed that recess 62 reveals upper surface 14 of base 13. On the other hand, recess 64 is aligned with opening 66 through base 13 of platform 12. Holding means 56 for mounting plurality of film containers or cartridges 70 in a side-by-side configuration may take other forms where platform 12 is unitary.

Figure 3:
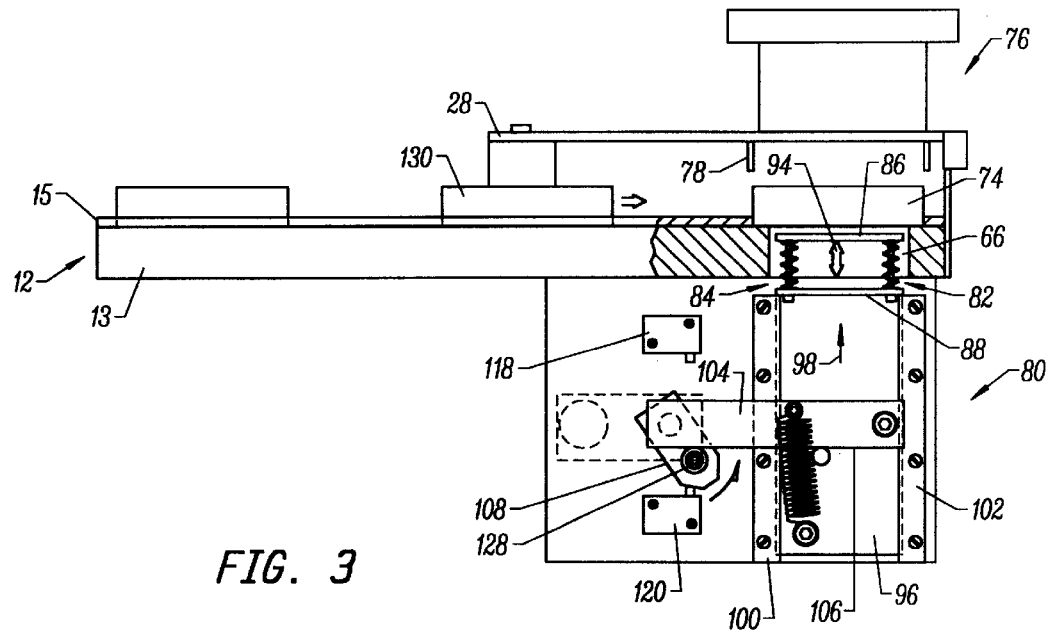
FIG. 3 is a side elevational view showing partial operation of the elevator mechanism of the present invention.
Figure 4:
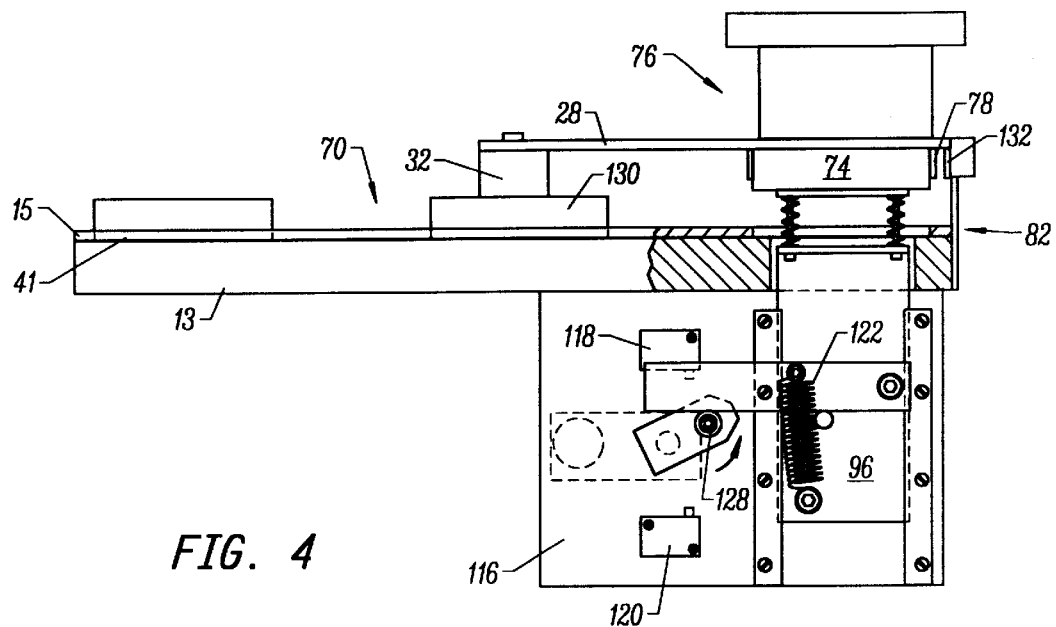
FIG. 4 is a side elevational view showing partial operation of the elevator mechanism of the present invention.
Figure 5:
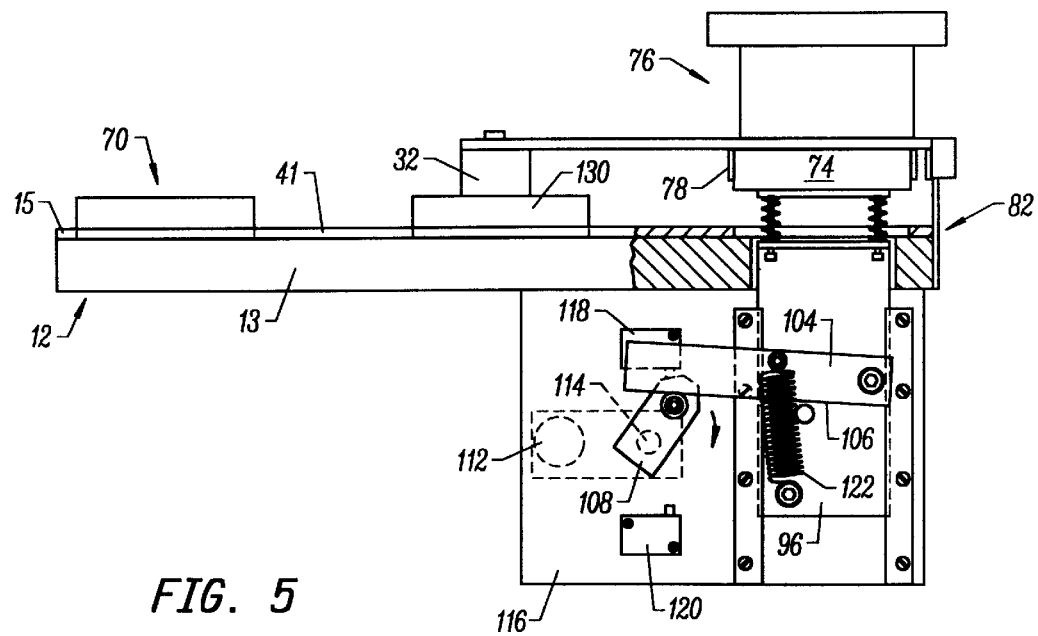
FIG. 5 is a side elevational view of the present invention showing partial operation of the elevator mechanism.

Motivating means 72 is also found in the present invention for removing a exemplary film container or cartridge 74 from holding means 56 at surface 14 of base 13 of platform 12. Motivating means 72, best shown in FIG. 1 also functions to move exemplary cartridge 74 into the vicinity of self-developing film camera 76, such as one manufactured by Polaroid, Cambridge, Mass., for use with integral film cartridges 70. Camera 76 is mounted to plate 28 and includes a lower open chamber structure 78 for accepting exemplary cartridge 74. Motivating means 72 may include an elevator 80. Elevator 80 possesses an element 82 for contacting exemplary cartridge or container 74. Embodied in element 82 is cushioning means 84 for absorbing force or pressure exerted on elevator element 82. Cushioning means 84 is defined by plates 86 and 88 which are connected to one another by a quartet of pins 90 surrounded by a quartet of springs 92, two of which are shown in FIGS. 3–5. Plate 86 is movable relative to plate 88, according to directional arrow 94. On the other hand, plate 88 is fixed to movable segment 96 which travels according to directional arrow 98 along guides 100 and 102. Guides 100 and 102 may be formed of self-lubricating polymeric material, FIG. 3. Arm 104 is fixed to segment 96 and includes a cam surface 106. Cam follower 108 connects to shaft 110 of motor mechanism 112, which is affixed to structural sheet 116. It should be apparent that structural sheet 116 attaches to base portion of platform 12. Micro switches 118 and 120 contact cam follower 108 to limit movement of cam follower 108 in its rotation about pivot 114 and also the movement of elevator element 82. Spring 122 is fastened to movable segment 96 and to arm 104, for biasing elevator element 92 upwardly, FIGS. 4 and 5.

Figure 6:
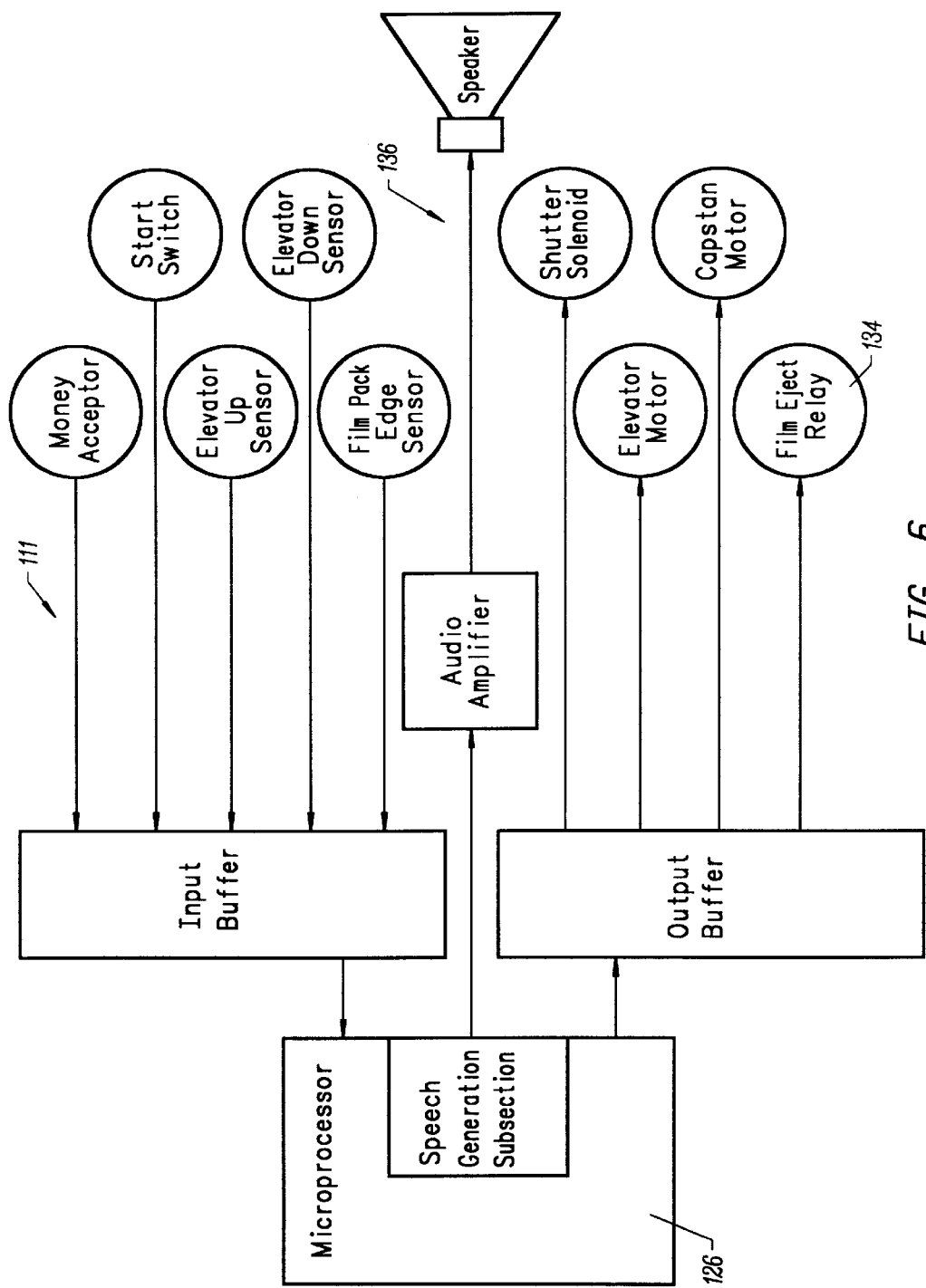
FIG. 6 is a schematic view depicting an electronic control system for the cartridge replacement in the present invention.
Figure 7:
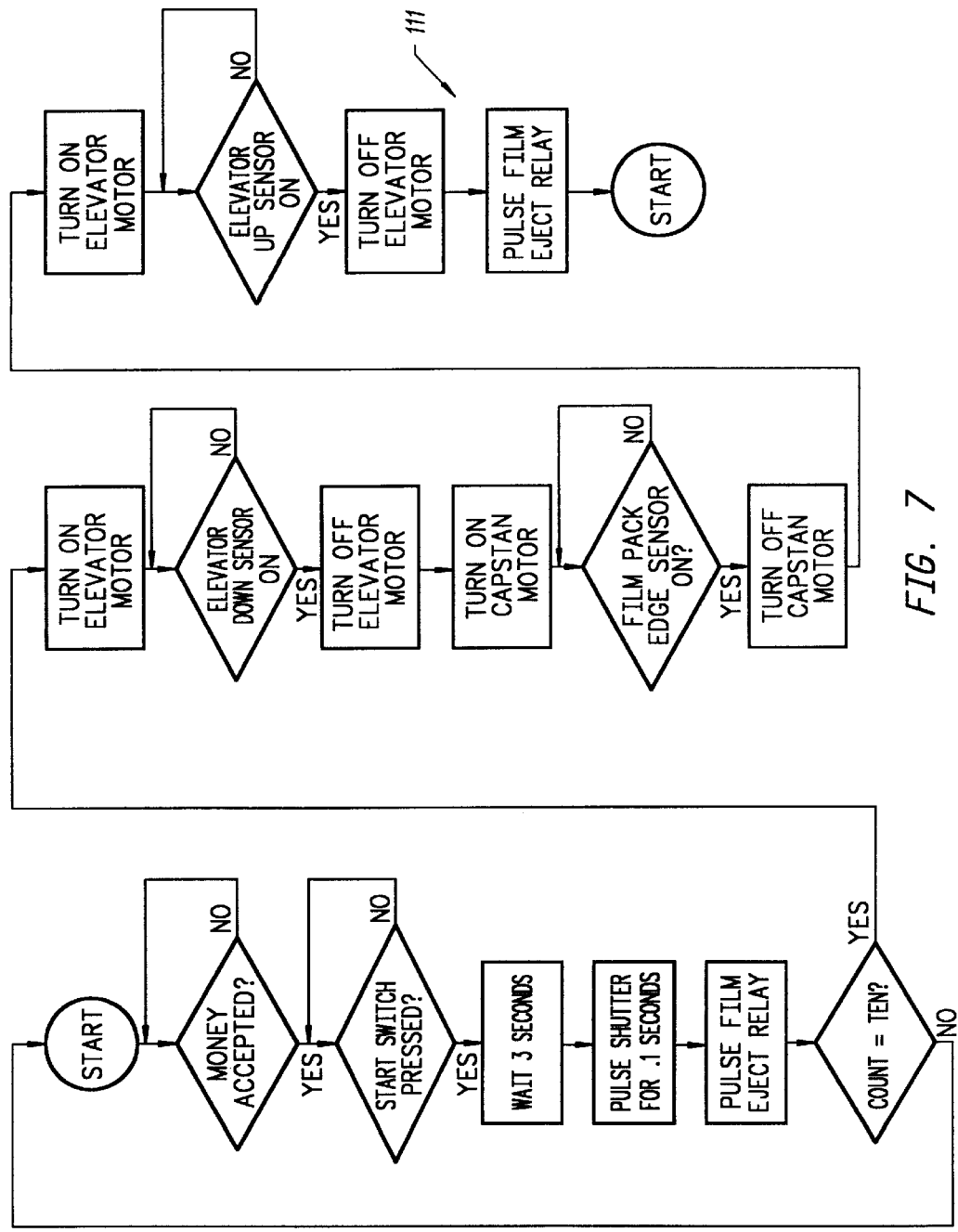
FIG. 7 is a schematic diagram depicting the logic employed in the present invention to operate the mechanism depicted in FIG. 6.

In operation, apparatus 10 may be controlled through manual switching of rotation means 38 and motive means 68. However, for use in a fully automated photo booth, a control mechanism is highly desirable. FIGS. 6 and 7 represent a typical controlling mechanism 111. FIG. 7 indicates a typical logic path. Microprocessor 126, which may be a model TSP5OCOX family, manufactured by Texas Instruments of Dallas, Texas, operates according to a vend sequence shown by FIG. 6 and 7. The photography system starts when money is accepted and microprocessor 126 reads the money acceptor and executes the sequence shown in FIG. 7. If, after a photo is vended, COUNT=TEN is found to be true. This indicates an empty cartridge of multiplicity of cartridges 70 is located in camera 76, specifically camera chamber structure 78. The cartridge change sequence is then initiated. Assuming film cartridge 74 is empty, the first step in a changing cartridge 74 with a fresh one is for a microprocessor to turn on elevator motor 112 in a clockwise direction until elevator down micro switch 120 activates. Motor 112 is then turned off. Motor 112 pushes cam follower 108 down against the action of spring 122. Arm 122 cam surface 106 contacts cam roller 128 which relies on cam follower arm 108. Empty cartridge 74, initially resting on plate 86, now rests on surface 14 within recess 64, FIG. 1A. Microprocessor 126 then turns on motor 46 to turn friction wheel or capstan 40. Turntable 15 then rotates relative to base portion 13 until a new cartridge 130, one of multiplicity of cartridges 70, lies beneath camera 76 and atop plate 86 of elevator element 80. Film pack sensor 132, FIG. 4, detects the trailing edge of the next cartridge 130. Microprocessor 126 then turns off motor 46 to prevent further turning of turntable 15. It should be noted that a bar code sensor may be optionally used to read a bar code of any of the multiplicity of cartridges 70, in order to accept or reject film found in multiplicity of cartridges 70, dependent on the date of manufacture. After sensor 132 indicates that cartridge 130 is in the correct position to be lifted into camera chamber 78, microprocessor 126 activates elevator motor mechanism 112. Such activation rotates cam follower 108 counterclockwise forcing cartridge 130 upwardly by the contact of cartridge 130 and plate 86. Cushioning means 84 provides compliant support for cartridge 130 at this juncture. A film eject relay 134 may be used to eject the cover on film cartridges such as those typically used with a Polaroid system. Micro processor 126 can issue verbal instructions using speech generation subsection 136 to assist the users of apparatus 10 or to post warnings of a condition where all the multiplicity of cartridges are empty.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A photographic film container loading apparatus supported on a base member and used in conjunction with a camera, comprising:
   a. a platform, said platform including a turntable rotatably linked to the base member, said platform further including a horizontal surface, said platform further connected to a central shaft element permitting rotation of said turntable about a vertical axis, said turntable further including an edge portion;
   b. holding means provided by said turntable for mounting a plurality of film containers in a side-by-side configuration at said platform horizontal surface;
   c. rotation means for turning said turntable relative to the base member, said rotation means including a rotatable shaft having a friction surface contacting said edge portion of said turntable, and a motor for turning said rotatable shaft; and
   d. motivating means for removing a film container from said holding means at the surface of said platform and to the vicinity of a portion of the camera for exposing, and for replacing the film container at a said platform surface after exposure of the film by the camera.

2. The apparatus of claim 1 in which said holding means comprises a multiplicity openings through said turntable, each opening including a shoulder for contacting a film container.

3. The apparatus of claim 2 in which said motivating means comprises an elevator, said elevator including an element contacting a film container and urging a film container outwardly from said platform surface to the vicinity of a portion of the camera for exposure.

4. The apparatus of claim 3 which additionally comprises mounting means for supporting the camera to said platform.

5. The apparatus of claim 4 in which said platform is rounded and said turntable edge portion comprises a rounded edge portion.

6. The apparatus of claim 3 in which said elevator element further includes spring means for biasing said elevator element.

7. The apparatus of claim 6 in which said spring means biases said elevator element toward the camera.

8. The apparatus of claim 7 in which said elevator further comprises cushioning means for absorbing pressure exerted on said elevator element.

9. The apparatus of claim 8 in which said cushioning means includes a first plate, a second plate, and a plurality of springs spanning said first and second plates.

10. The apparatus of claim 9 in which said plurality of springs further include guides for controlling movement of said springs.

11. The apparatus of claim 7 in which said elevator element further comprises an arm connected thereto, said arm having a cam surface, and a cam follower riding on said cam surface to move said arm and the elevator element connected thereto.

12. The apparatus of claim 1 in which said motivating means further includes as opening in said base portion of said platform alignable with any of said multiplicity of openings through said turntable.

\* \* \* \* \*